Jan. 23, 1934.  G. L. COLBIE  1,944,494
WORK FEED CONTROL MEANS FOR LOCATING STAPLES IN WIREBOUND BOXES
Filed May 13, 1932  6 Sheets-Sheet 2
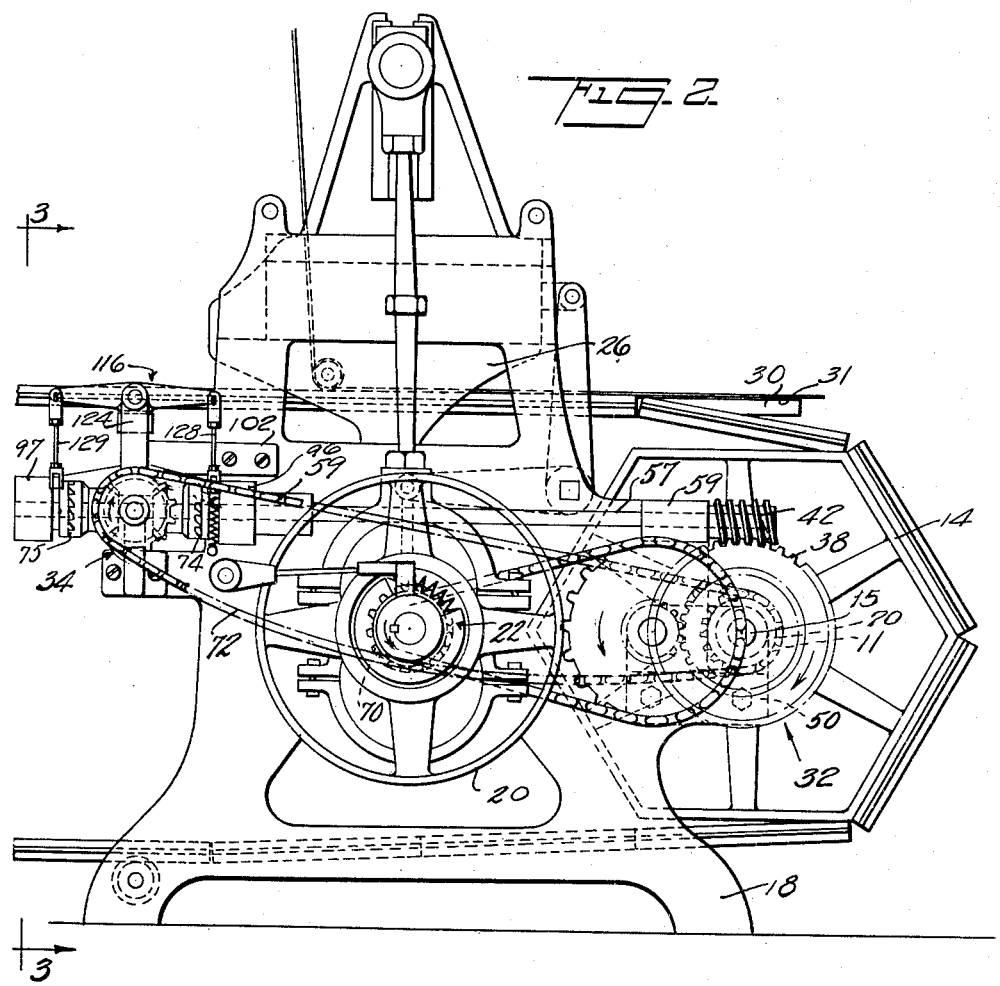
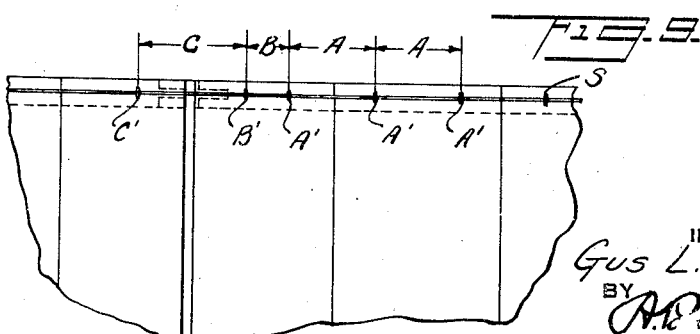
INVENTOR.
Gus L. Colbie
BY
ATTORNEY

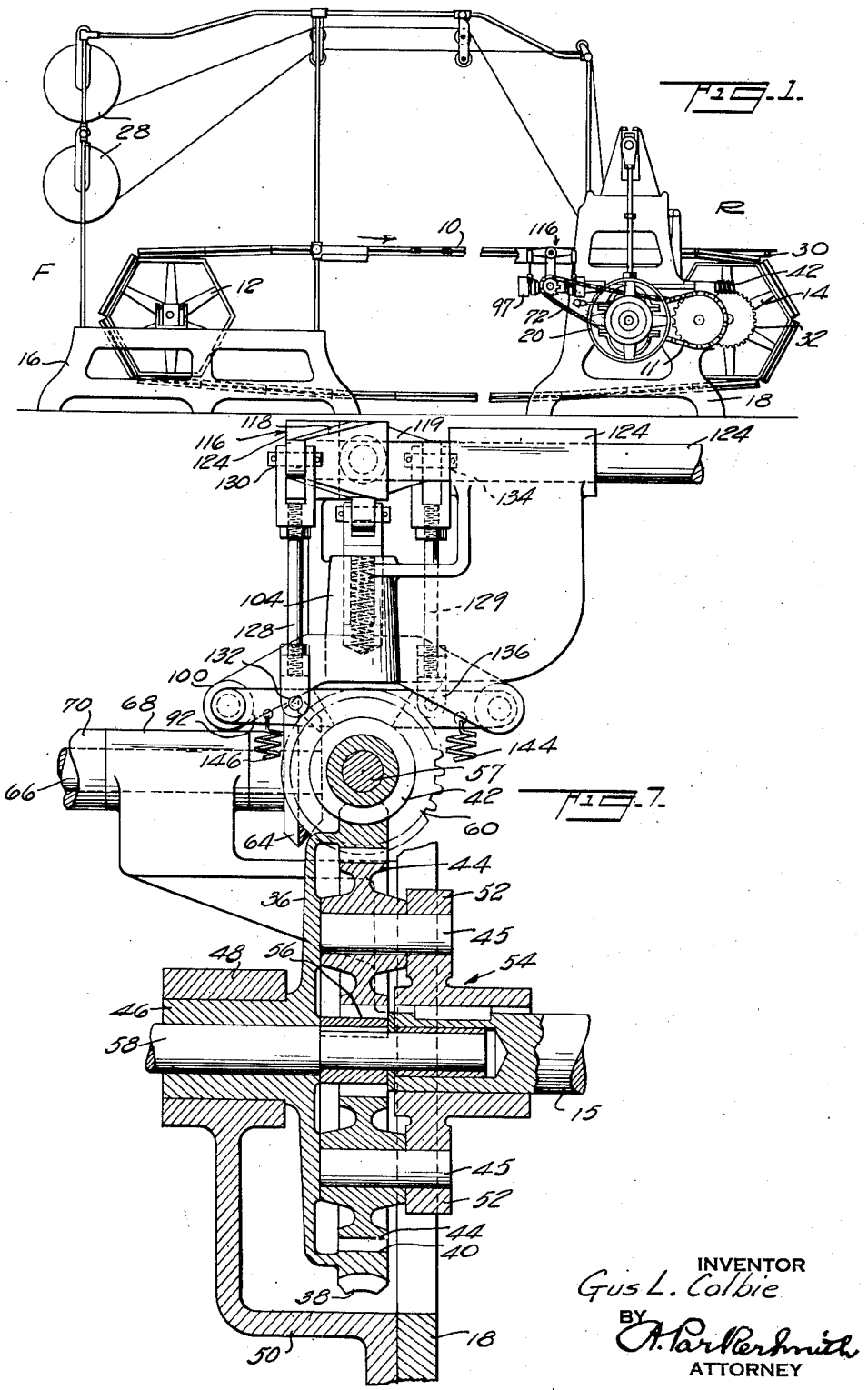

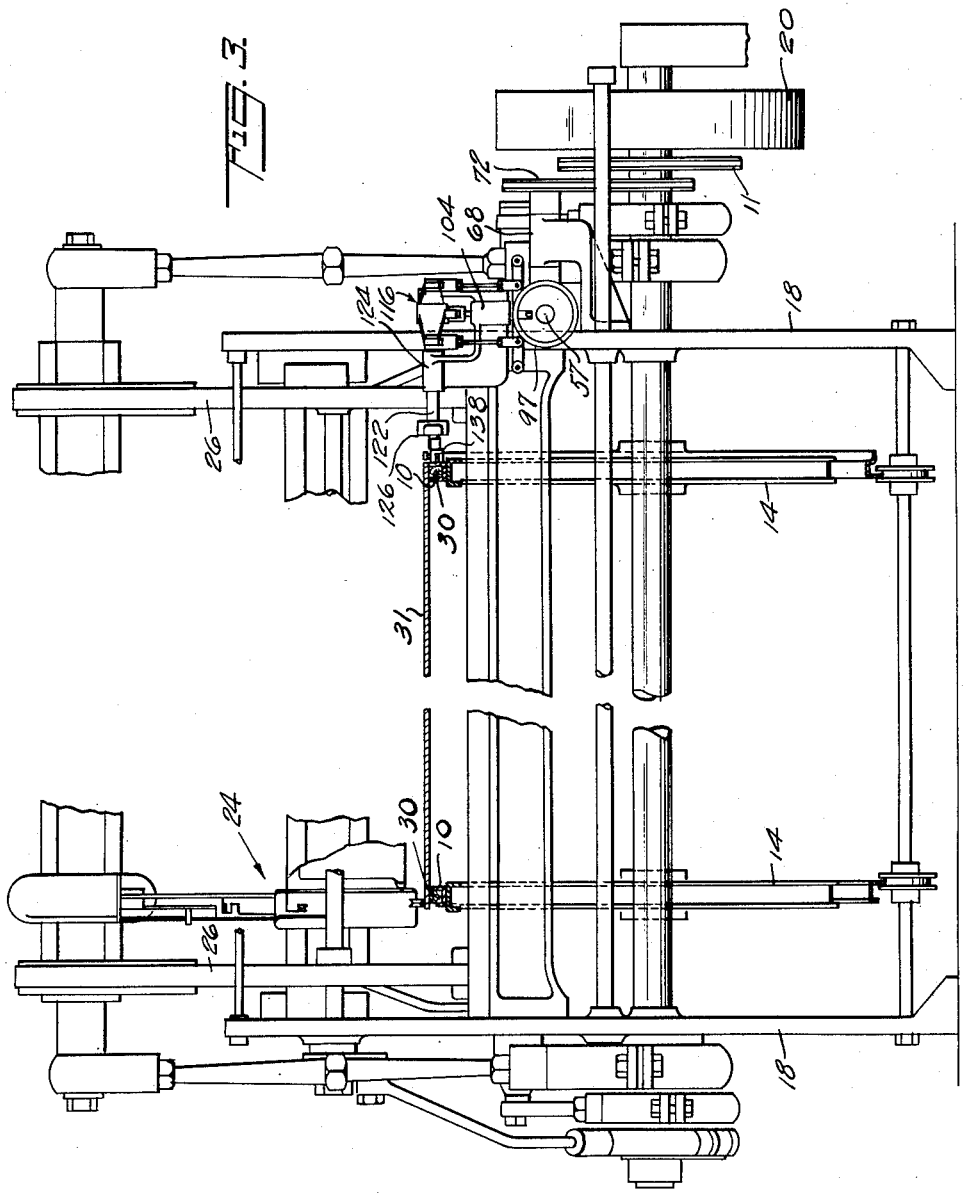

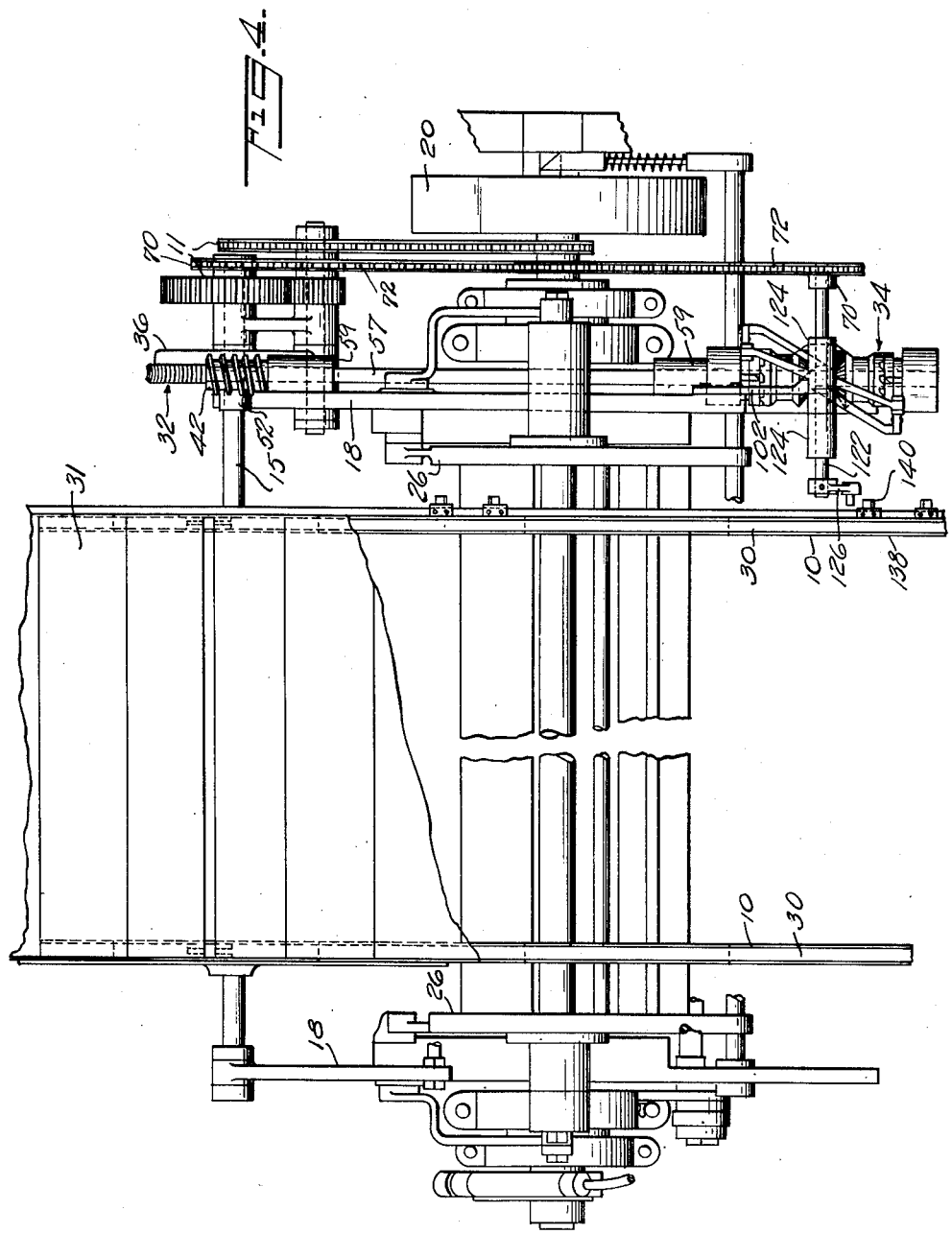

Jan. 23, 1934.   G. L. COLBIE   1,944,494
WORK FEED CONTROL MEANS FOR LOCATING STAPLES IN WIREBOUND BOXES
Filed May 13, 1932   6 Sheets-Sheet 5
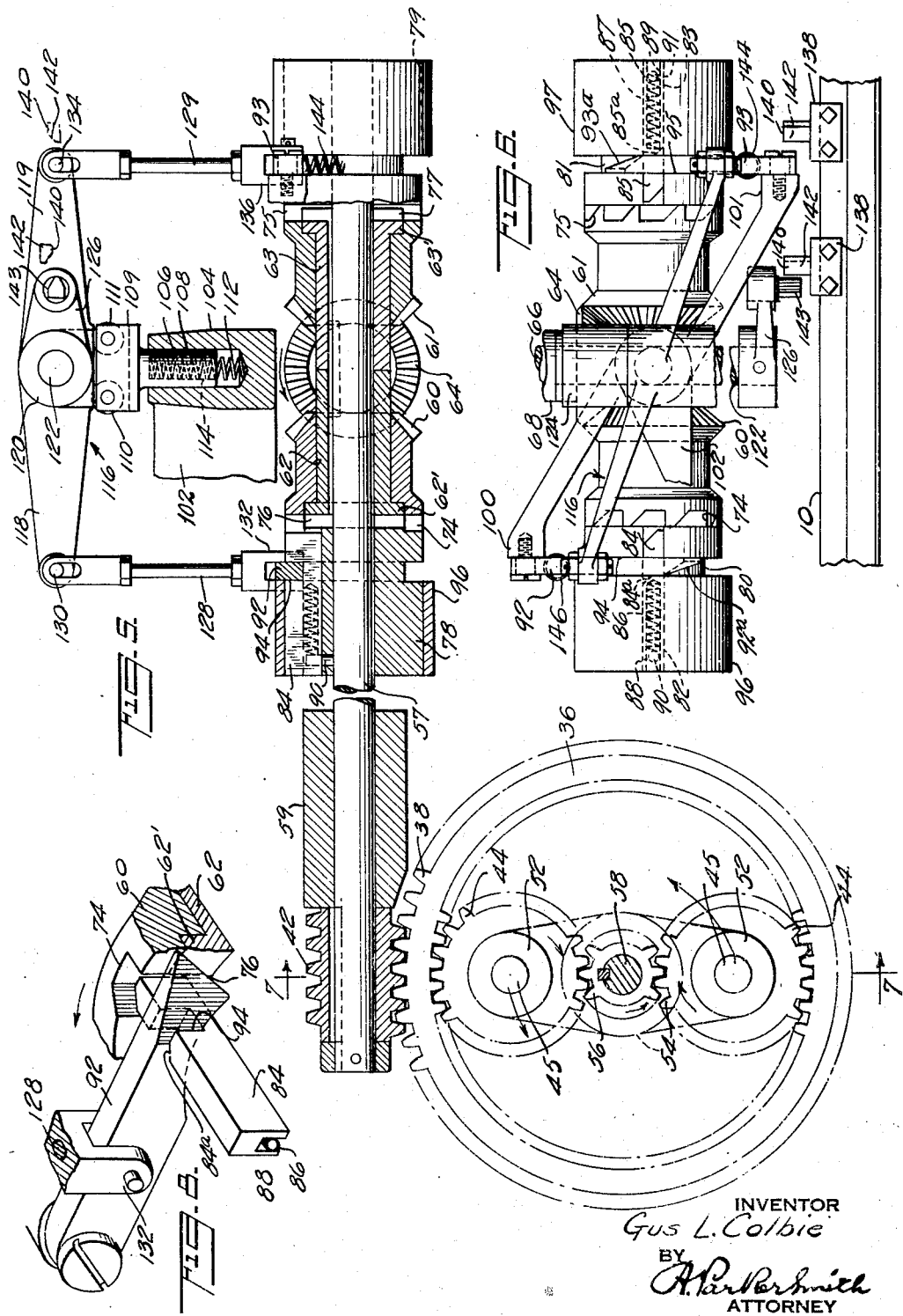
INVENTOR
Gus L. Colbie
BY
A. Parker Smith
ATTORNEY Jan. 23, 1934.  G. L. COLBIE  1,944,494
WORK FEED CONTROL MEANS FOR LOCATING STAPLES IN WIREBOUND BOXES
Filed May 13, 1932   6 Sheets-Sheet 6
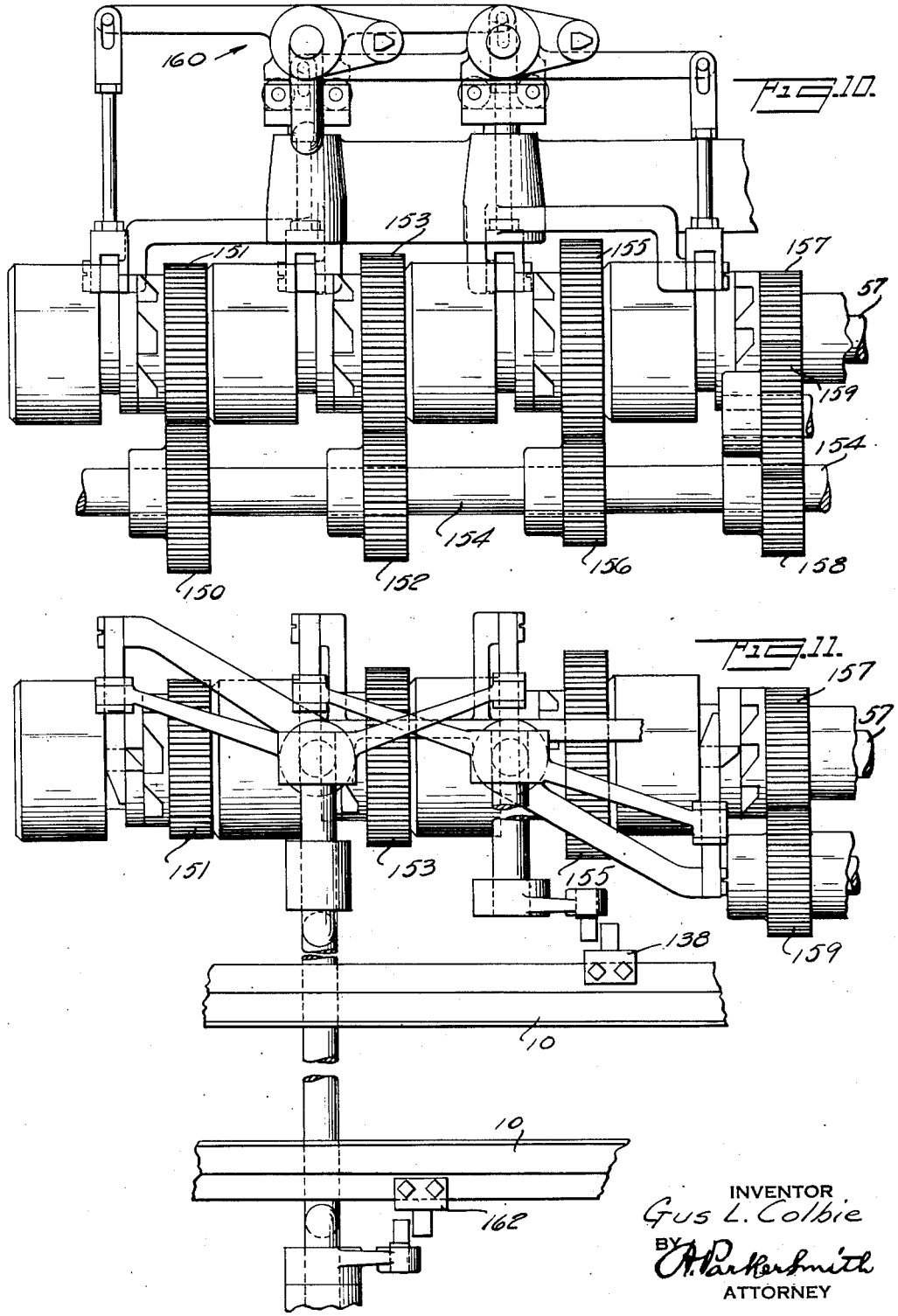
INVENTOR
Gus L. Colbie
BY
R. Parker Smith
ATTORNEY Patented Jan. 23, 1934

1,944,494

UNITED STATES PATENT OFFICE 1,944,494

WORK FEED CONTROL MEANS FOR LOCATING STAPLES IN WIREBOUND BOXES

Gus L. Colbie, Brooklyn, N. Y., assignor to F. MacGovern Corporation, New York, N. Y., a corporation of New York Application May 13, 1932. Serial No. 611,157

14 Claims. (Cl. 1—8.3)

This invention relates to a machine for use in constructing boxes or crates, particularly those made up from blank forms held together by binding wires, and presents an improved method and apparatus for controlling the location of certain fasteners usually employed to affix the binding wires to the several panels of each blank.

According to the present practice, as disclosed for instance in Thompson Patents Nos. 1,595,033, 1,669,383 and 1,738,806, box or crate blanks are fabricated by placing sheets or strips of veneer over cleats, all of which parts are continuously movable along the bed of the machine by means of endless work conveyor chains. Fasteners, in the form of staples are then driven over binding wires through the veneer and into the cleats, to secure the veneer to said cleats and to join a plurality of panels together, all this being done while the work is carried along by the chains.

Generally speaking, the staples on each blank may be uniformly spaced apart, but it is always desirable to accurately locate the first and last staple in each panel with reference to the edges thereof. There are also cases in which the intermediate staples must be in accurately controlled locations.

In the type of construction shown in the above mentioned patents the staples are adapted to be driven a certain minimum distance apart or be separated a distance greater than said minimum distance, and this result is accomplished by discontinuing the activity of the fastener setting mechanism for time periods of greater or less length while the work is advancing at a uniform speed thereunder.

According to my present invention on the other hand, the fastener setting mechanism is continuously operated at a uniform speed, setting a fastener once in every successive, uniform period of time, but the speed of the box panel and cleat feeding mechanism is adapted to be varied in such manner as to accelerate or retard the normal uniform movement of the work feed chains carrying said panels and cleats.

It is therefore the object of this invention to provide means for controlling the position of staples by varying the speed of the work, and so produce the result of setting staples at distances apart, greater than or less than a normal distance between successive staples, set while the work was moving at uniform speed.

In the operation of machines disclosed in the aforementioned patents, the operation of the fastener setting mechanism was stopped after each staple was driven and this placed undue strain upon the clutch parts connecting the drive shaft with the temporarily stopped mechanism. According to the present invention, the fastener setting mechanism is continuously operated, which thus eliminates the use of a clutch for the connection of the fastener setting mechanism to the power drive and therefore presents an additional saving on that point.

Other features will appear in the following specifications and drawings in which a preferred embodiment of my invention at present known to me is described and illustrated.

In the drawings

Fig. 1 is a side elevation of a wire bound box and crate blank making machine with my invention applied thereto.

Fig. 2 is an enlarged side elevation of the operating and delivery end of the machine, i. e., the one at which the fastener setting mechanism is located.

Fig. 3 is a transverse section through the work carrying chains and an elevation of the operating end of the machine looking in the direction of arrows 3—3 of Fig. 2, parts being broken away.

Fig. 4 is a plan view of the operating end of the machine with parts broken away.

Fig. 5 is an enlarged longitudinal section with parts shown in elevation of a clutch and work-feed speed-control mechanism.

Fig. 6 is a plan view of the clutch and tripping mechanism shown in Fig. 5.

Fig. 7 is a vertical section taken on the line 7—7 of Fig. 5, with part of the clutch and tripping mechanism shown in elevation.

Fig. 8 is a detail in perspective of a latch bar and bolt member which cooperates with the clutch.

Fig. 9 is a fragmentary plan view of a portion of a box blank, showing the location of several staples, arranged at different distances apart, as can be done by the mechanism of this invention.

Fig. 10 is an elevation of a modified variable speed control mechanism and

Fig. 11 is a plan view of the parts shown in Fig. 10.

Throughout the drawings, like reference characters indicate like parts. Referring to Fig. 1, the general machine structure shown on the drawings is that of a standard type of machine used to produce wire bound box or crate blanks and generally comprises a pair of continuously driven endless work-feed chains 10 carried by sprocket wheels 12 and 14, said sprocket wheels being journaled on frame members 16—18, one at each end of the machine. The forward end of the machine to which the materials are fed is generally designated by F and the rearward or operating end by R.

At the operating end, the principal parts there located comprise the power drive pulley 20 (see Fig. 3) which is geared directly to the feed chain 10 by means of chain drive and speed reducing gear mechanism 11. Pulley 20 is connected, through a clutch member 22 (Fig. 2) to a staple forming and driving, or fastener setting mechanism 24 (partly shown in Fig. 3) and also to mechanism for reciprocating a carriage 26 which synchronizes the movement of the fastener setting mechanism with the movement of the box panels and cleats carried on chains 10, such synchronization being established and continued during the short time in which a staple is being driven.

Rolls of binding and staple wire 28 are supported on a skeleton frame structure above the machine as indicated in Fig. 1, and the wires are led over guide pulleys to and beneath the fastener setting mechanism, where they are secured to the panels of veneer by the staples, all for the purpose of binding the panels together and thus forming the box blanks in the usual way.

To operate the above described machine, sets of box cleats 30 (best shown in Fig. 3) are first placed in the channels of the moving feed chains 10, and strips of veneer 31, 31 or like material are placed upon and over the cleats before the assembly so formed reaches the fastener setting mechanism. Upon reaching said fastener setting mechanism staples are formed and driven over and around the binding wires, through the panels of veneer and into the cleats on the end, thus securing the veneer strips to the cleats, and also binding the panels of each blank together, all in the manner heretofore common in the art.

The practice as to locating the staples heretofore followed has been to control the location of each by means of a pattern made up with lugs set at various distances apart, the minimum distance of which is limited by the speed of the work-feed chain in relation to the throw of the staple driving mechanism, thus limiting the staple spacing apart action to the production of fixed minimum distances, but offering no limitation as to increase of such fixed minimum distance.

As contra distinguished from the described prior method, this invention provides a means for varying the speed of the moving work chains, which speed can be increased or decreased for the purpose of either increasing or decreasing the normal space between staples being set at the time of such speed variation. According to one embodiment, I prefer to employ a planetary gear and clutch mechanism and a tripping means therefor, which accomplishes the above outlined desired results in a simple manner.

Referring to Figs. 2, 3 and 1, the planetary gear mechanism is generally indicated by the reference character 32 while the clutch and tripping mechanism is indicated generally by the reference character 34. In Figs. 5, 6 and 7, the above named mechanisms are shown on an enlarged scale.

The planetary gear mechanism (best shown in Fig. 5 and Fig. 7) comprises an annular, revolvable gear housing 36, having external teeth 38 and internal teeth 40. Said external teeth are adapted to be engaged and driven by a worm 42, while the internal teeth are adapted to be engaged by a pair of spur gears 44—44. The housing 36 has a projecting hub 46 which is journaled in a bearing 48 forming part of a bracket 50, which bracket is secured to the frame 18.

Spur gears 44—44 are mounted on pins 45—45 fast on the oppositely extending arms 52 of a rotatable spider 54, which spider is keyed to the sprocket wheel drive shaft 15 (see Fig. 7).

Between the spur gears 44—44, and meshing therewith, is a pinion 56, which is keyed on a shaft 58 journaled within the hub 46 and driven through the reduction gear mechanism 11. The inner end of the shaft 58 projects within an axial bore in one end of the sprocket shaft 15. While the machine is operating normally, that is, driving staples at uniform distances apart, the drive is direct through the shaft 58 and pinion 56 to the spur gears 44, 44 and the spider mounting 54 and 52. The annular housing 36 being held stationary by worm 42, the spider is rotated, due to the planetary motion and rotation of the spur gears 44—44 as they roll around within the internal teeth of the stationary gear 40, the spider 54 revolving at half the speed of shaft 58.

When, however, the drive of the sprocket shaft 15 to which spider 54 is keyed is to be accelerated or retarded, the speed of the motion so transmitted by the planetary gear mechanism above described is slightly increased or decreased by a slow rotation of the housing 36 in the same direction as the spider or in an opposite direction to same. Such movement of 36 is caused and controlled by means of a clutch and clutch tripping mechanism which imparts a drive in one direction or the other to the worm 42, when actuated. It is obvious that a movement of the housing 36 in the same direction as the spider 54 will cause the movement of the spider and sprocket shaft 15 to be accelerated, while a movement of the housing 36 in an opposite direction will cause the movement of the spider and sprocket shaft to be retarded.

To accomplish the said accelerating and retarding movement of the work feed sprocket chain, it is necessary to provide a mechanism to rotate the shaft 57, on which the worm 42 is keyed, and drive said worm in a clockwise or counterclockwise direction (looking at Fig. 7) according to whichever direction is required, and to provide tripping means for throwing said mechanism into and out of operation. This mechanism is generally indicated at 34 Fig. 2, and in detail in Figs. 5, 6 and 7.

The worm shaft 57 is mounted in bearings 59—59 (Figs. 4 and 5) secured to the frame 18 and carries on its forward end the controlling mechanism for the drive of said shaft. Said controlling mechanism comprises a continuously driven bevel gear mechanism consisting of the following elements: Two bevel gears 60—61 are mounted on sleeves 62, 63 which are keyed to the worm shaft 57 and have flanged outer ends 62′ 63′. A driving bevel gear 64 engages said gears 60—61 and is mounted on a shaft 66, which shaft is mounted in a bearing 68 (Fig. 7) and is driven in a clockwise direction (as indicated by the arrows in Fig. 2) through sprocket and chain connection 70—72 from the power drive shaft 15 (see Figs. 2 and 4). Receiver forming teeth 74 are cut in the outer end face of the sleeve of bevel gear 60 as shown in Fig. 2 and similar teeth 75 are cut in the outer end face of the sleeve of gear 61. Slots 76 and 77 are cut in each of the sleeve flanges 62'—63', respectively, and normally lie in a vertical plane.

Two clutch collars 78—79 are carried on the worm shaft 57, one adjacent each of the bevel gear clutch toothed ends 74—75, each having an annular groove as indicated at 80—81 (Fig. 6) and also a longitudinal groove as indicated at 82—83. Within each of the latter grooves, there is a sliding bolt, one indicated at 84 within the groove 82, and one 85 within the groove 83. Each bolt is normally forced toward a recess between teeth 74 or 75 of one of the bevel gear members 60 or 61 by means of a compressed spring 86 or 87 nested in opening 88 or 89 and anchored to pin 90 or 91 in each of the respective clutch collars 78—79. Each bolt is normally restrained in a retracted position against movement by its spring, by the engagement of a latch bar, such as 92, with a transverse slot 94 in the bolt 84, and a latch bar 93 with a transverse slot 95 in the bolt 85.

It is therefore obvious that so long as the bolts 84—85 are in their retracted positions, as viewed in Fig. 5, the clutch collars 78—79, sleeves 62—63 and shaft 57 will remain stationary while the bevel gears are permitted to be freely driven in opposite directions about the said sleeves 62—63. If, however, one of latch bars 92 or 93 is lifted from either of the slots 94 or 95, as for instance if the latch bar 92 were lifted from the slot 94, that bolt would plunge forward and engage a recess between teeth 74 in its cooperating bevel gear and the vertical slot 76 in the cooperating flange of sleeve 62; thereby locking together the sleeve 62, gear 60 and worm shaft 57 and cause the latter to be rotated in the direction of movement of the said gear 60, which is continuously rotating in a clockwise direction when looked at from the right hand end of shaft 57 as it is shown in Fig. 5. Such rotation of shaft 57 will cause planetary gear housing 36 to begin turning slowly in a clockwise direction (looking at Fig. 5), which will decrease the speed of revolution of spider 54, which is revolving in a counter-clockwise direction, and thus will correspondingly decrease the speed of rotation of shaft 15 and of sprocket wheels 14, so that the work carrying chains 10 will move more slowly. Sleeves 96—97 may be placed over the collars 78—79 to prevent the bolts from being thrown outward from the latter by centrifugal force.

It is to be noted that the inner ends of each of the latch bars 92 and 93 are beveled, as shown at 92a and 93a respectively and are adapted to lie in the path of the beveled edges 84a and 85a formed on one surface of the slotted portions 94—95 of the bolts 84 and 85, when either of said bolts is released from engagement with its cooperating latch bar 92 or 93, the purpose of which beveling will be hereinafter described.

The position of each of said latch bars 92—93 is controlled by means of a tripping mechanism now to be described which is actuated by cam lugs 138 (shown in Fig. 6) on the work feed chain 10. The latch bars 92—93 are pivotally mounted at their ends on lugs 100—101 formed on a bracket 102 (Figs. 5 and 6), which bracket is secured to the frame 18. A vertically disposed bearing block 104 (see Fig. 5) is also formed as a part of the bracket 102 and is placed midway between the latch bars 92—93. Within a central bore 106 in said bearing block 104 is mounted a sliding rod 108, which rod has a forked upper end portion 109 for the support of a pair of rollers 110—111. A compression spring 112, is so placed within a bore 114 in the lower end of the sliding rod 108, that the lower end of it protrudes below said bar and engages the bottom of the bore 106 in the bearing block, thereby causing the sliding rod 108 to be pressed upwardly.

A rocker beam 116, comprising two arms 118—119 extending outwardly from a central hub 120 is mounted on a rocker shaft 122. Said shaft 122 is supported by bearings 124—124, formed as a part of the bracket 102, and has a rocker arm 126 secured to its inner end in close relation to one of the work feed chains 10. At the ends of each of the arms 118—119 of the rocker beam 116, there are suspended turnbuckle links 128—129. One of said links 128 is secured at 130 to the arm 118 and at 132 to the latch bar 92, while the other of said links 129, is secured at 134 to the arm 119 and at 136 to the latch bar 93.

When assembled, the rollers 110—111, mounted within the forked end of the sliding rod 108, engage a channel in the lower flat surface of the hub 120 of said rocker beam 118, and since the spring 112 exerts an upward pressure on the rod 108, the rocker beam 116 assumes and normally maintains a horizontal position, with the result that the latch bars 92—93 are left in normal engagement with their respective bolts 84—85, which are consequently held in retracted positions as indicated in Fig. 8.

A number of cam lugs 138 are adjustably mounted on one of the work feed chains 10 as illustrated in Fig. 4 and have projecting portions 140 provided with cam faces 142 (shown in Fig. 5), which cam faces are adapted to engage a wedged shaped pin 143 projecting in its path and carried by the outer end of the rocker arm 126 fast on shaft 122. Said cam lugs are so arranged that the cam faces of some lugs will tip the rocker beam 116 in one direction to cause one latch bar 92 to be lifted, while the cam faces of other lugs will tip the rocker beam in an opposite direction to cause the other latch bar 93 to be lifted, with the result that either bolt 84 enters recess 74 (Fig. 8) or bolt 85 enters recess 75, which operations cause the worm shaft 57 and worm 42 to be rotated in a clockwise or counter clockwise direction when looking from the right hand end of Fig. 5 as previously described.

Referring to Fig. 9, let it be assumed that the staples indicated at S are to be driven in the box blank portions as there shown near the corners of two panels joined together by the binding wire W. The normal spacing of staples such as results from normal feeding movement of the panels, is indicated by the distances A, A, while the distance B has been made less than the normal spacing so as to locate the staple at the required distance from the edge of the panel, and the distance C has been made greater than the normal distance to jump the space between panels and locate the next staple at the required distance from the edge of the adjoining panel.

While the staples A', A', A', are being driven, the machine is operating normally and the transmission of force, or drive is direct through the pulley shaft, reducing gear mechanism 11, shaft 58, and planetary gear mechanism acting merely as another reducing gear, to the chain sprocket shaft 15, the rocker beam 116 being in horizontal position. But, when the staple B' is to be driven, the projecting cam portion 140 of a cam lug 138 engages the wedge shaped pin 143, on the rocker arm 126, and rocks said arm downward, which in turn tips the beam in the direction which causes the arm 118 to lift.

The link 128 is thus drawn upward and the latch bar 92 is lifted out of engagement with bolt 84. This permits the bolt 84 under urge of spring 86 to engage the slot 76 in flange 62' and a recess 74 in the hub of bevel gear 60, with the result that rotation of bevel gear 64 is transmitted through the gear 60, and sleeve 62 to worm shaft 57. The rotation of the worm shaft and its worm 42, then revolves the planetary gear housing 36 in a clockwise direction opposite to that in which the spider 54 is turning, which causes the speed of rotating the shaft 15 to be decreased. This reduced speed of shaft rotation causes a correspondingly retarded movement of the work, and, since the speed of the fastener setting mechanism remains unchanged, the staple B' will be driven at a distance from the previously driven staple A' less than the normal distance indicated between staples A'—A'.

When the projecting portion 140 of the cam lug 138 has passed the wedge shaped pin 143 on the rocker arm 126, the latch bar 93 is returned to its normal position by means of a tension spring 144. In this position the beveled end 93ª of said latch bar will lie directly in the path of the beveled edge 85ª of the transverse slot 95 in the bolt 83. Therefore, when the said beveled edge 85ª of the bolt is engaged by the beveled end 93ª, the said bolt is cammed out of engagement with the clutch teeth 75 and flange slot 77, thus unlocking these parts and breaking a connection in the train driving the clutch. This occurs at the end of one complete revolution of shaft 57. The above described correlation of some of the elements of clutch and clutch tripping mechanism, is well shown in Fig. 8.

Since the bevel gear 61 drives the planetary gear housing 36 in the same direction as the spider 52, when said gear is properly clutched to the worm shaft it will accelerate the speed of the sprocket drive shaft 15 and increase the normal distance between staples then being driven. This is the mechanism which is set into operation when the staple C' is driven as shown in Fig. 9, which is spaced at a greater distance from staple B' than the normal distance from staple A' to A'.

To set the clutch mechanism into operation for the proper wider spacing of the staple C' from B', the rocker beam 116 is tipped in an opposite direction to that previously described and lifts the latch bar 93 against the tension of a spring 144, thus permitting the bolt 85 to engage the clutch teeth 75 and flange slot 77. This locks bevel gear 61 to sleeve 63, which sets the worm shaft in motion again but in an opposite direction to that previously described. All of the operations for engaging and disengaging of clutch teeth 75 with and from the bolt 85 are the same as described for the clutch teeth 74 and bolt 84, so that a repetition of the description seems unnecessary. It will be observed that the links 128—129 are provided at their upper ends with elongated slotted connections at 130 and 134 (Fig. 5), so that the rocker beam 116 may be tipped to trip one latch bar without affecting the other, or having its tripping movement checked thereby.

As the mechanism described only provides for one definite change of dimension of the staple spacing, i. e., a spacing of a distance definitely greater than the normal, or definitely less, it may be desirable in some cases to vary either of said fixed distances, and for this purpose, I have provided a variable speed mechanism such as shown in Figs. 10 and 11.

In this modification, I substitute for the simple bevel gear drive, a variable speed drive which comprises a plurality of spur gears 150, 152, 156 and 158, of various diameters on a driving shaft 154 which will mesh with cooperating gears 151, 153, 155 and 157, which may rotate freely on worm shaft 57 or be locked thereto. An idler gear 159 is interposed between 157 and 158 to provide a reverse drive.

Similar clutch mechanism to that previously described, also similar latch and tripping mechanism will be used to unite any one pair of the above said gear combinations with the worm shaft 57, to actuate the planetary gear mechanism at any one of the various speeds provided thereby.

In the operation of this form of structure as illustrated, it will be necessary to provide an additional set of tripping mechanism indicated generally at 160, which will be actuated by a second set of cam lugs, one of which is shown at 162 (Fig. 11) on the second work feed chain. The combined set up of the lugs 138—162 on each chain 10, may be arranged in any desired order according to the requirements for staple locations. It is possible with the arrangement shown to space staples apart at three different distances greater than the normal spacing and one position less than the normal, or in the reversed arrangement, if the clutch connections are similarly reversed. While these figures of drawings illustrate one combination for varying the positions of staples, it will be readily observed that this combination may be varied, or, by slight changes in the cam lugs, additional clutch drive and tripping devices may be added thereby providing innumerable variations of spacing between staples.

Other forms of tripping mechanism may be substituted for the lugs on the work feed chain, thus a pattern bar having the desired number of cam lugs thereon which may be tripped by one lug on the work feed chain for each full box blank length and said pattern bar may then actuate the work feed clutch tripping mechanism.

Various other changes may be made in the structures here shown and described as forming several embodiments of my invention, any such modifications still being within the scope of the invention here claimed, if the principles of construction and results described are substantially preserved, within the definitions of the appended claims.

Having described my invention, I claim

1. A machine for use in making boxes comprising in combination, means to feed continuously at a normally uniform speed a plurality of box parts, staple setting mechanism operable at regular intervals upon said moving box parts to space a succession of staples at normal uniform distances apart thereon, and mechanism for automatically increasing or decreasing the speed of the work feed continuously throughout any desired period of the operations; whereby certain staples may be driven at distances apart greater than such normal distance or less than such normal distance.

2. A machine for use in making boxes comprising in combination, means to feed continuously at a normally uniform speed a plurality of box parts, staple setting mechanism operable at regular intervals upon such moving box parts to space staples at certain normal distances apart thereon, and means for retarding the normal feed of the box parts continuously throughout any desired period of operations to decrease the distance between any two or more selected staples.

3. A machine for use in making boxes comprising in combination means to feed at a normal speed a plurality of box parts, staple setting mechanism operable at regular intervals upon such moving box parts to space a series of staples at certain normal uniform distances apart thereon, a normally inactive work-feed speed-changing mechanism, adapted, when in operation, to reduce the speed of the moving box parts, and means to actuate said mechanism during selected periods of time; whereby selected staples may be driven into said box parts at distances apart less than said normal spacing.

4. A machine for use in making boxes comprising, in combination, means including endless feed chains for feeding continuously at a normally uniform speed a plurality of box parts, staple setting mechanism operable at regular intervals upon such moving box parts to place a series of staples at a certain uniform normal distance apart, a second mechanism adapted to reduce or increase the rate of movement of said chains during controllable periods of their operation and actuating means for said second mechanism energized by the moving work feed chain to put said second mechanism into operation; whereby the normal speed of the work may be increased or decreased to space certain staples at a distance apart greater than the normal distance or less than said normal distance.

5. In a box making apparatus comprising a staple setting mechanism operable from a power driven means, and means for continuously feeding materials at a normal speed to the zone of operation of said staple setting mechanism, so that staples may be driven therein at normal distances apart, the combination with said above described apparatus, of means for accelerating the normal work feed speed and means for retarding the normal work feed speed, together with automatic means for setting into operation either one of said last recited means, whereby selected staples may be driven at distances apart greater than a normal distance or less than a normal distance.

6. In a box making apparatus comprising a staple setting mechanism operable from a power driven means, and means for continuously feeding materials at a normal speed through the zone of operation of said staple setting mechanism to drive staples at normal distances apart therein, the combination, with said above described apparatus, of means for accelerating the normal work feed speed and means for retarding it, a device for actuating either said accelerating or said retarding means, and a pattern means for energizing said device at predetermined periods during travel of the continuously operating feeding means; whereby selected staples may be driven at distances apart greater than a normal distance or less than said distance.

7. In a box making apparatus comprising a staple setting mechanism operable from a source of power, and endless chains for continuously feeding materials at a normal speed to the zone of operation of said staple setting mechanism to drive staples into said materials at normal distances apart, the combination, with said above described apparatus, of a duplex normally inactive mechanism having a part adapted to accelerate and another adapted to retard the normal driving movement of said work feed chains, a device for throwing either portion of said normally inactive mechanism into operation during selected periods, and pattern means for actuating said device.

8. In a box making apparatus comprising a staple setting mechanism operable from a power driven means, endless chains running over sprocket wheels for continuously feeding materials at a normal speed to the zone of operation of said staple setting mechanism to drive staples into said materials at normal distances apart, and a train of mechanism for driving said chains, the combination, with said above described apparatus, of a normally inactive mechanism adapted to either accelerate or to retard the normal driving movement of said work feed chains, comprising a planetary gear mechanism forming an element in said train of chain driving mechanism located between said power driven means and said sprocket wheels also comprising an internal gear, and a device for rotating said internal gear of said planetary gearing in either a clockwise or a counter clockwise direction at selected times, and so changing the speed of rotation of the sprocket drive shaft, whereby selected staples may be driven at distances apart greater or less than said normal distances.

9. A machine for use in making boxes, comprising in combination a sprocket chain conveyor for feeding a plurality of box parts through said machine at a normal uniform speed, and driving mechanism therefor, staple setting mechanism operable at regular intervals upon the moving box parts to insert staples in said box parts at certain normal distances apart, an intermediate, multiplex, variable speed drive mechanism cooperating with the sprocket chain drive adapted to be actuated intermittently, and selecting means on said chain drive adapted to set into operation one or another portion of said multiplex variable speed mechanism, whereby the normal speed of the feed chain may be varied to different degrees and so cause staples to be set at different distances apart varying to a greater or less degree from the normal spacing.

10. A machine for use in making boxes comprising, in combination, means to feed at a normal speed a plurality of box parts comprising endless chains, staple setting mechanism operable at regular intervals upon such moving box parts to set staples at certain normal distances apart, an intermediate, variable speed element in said feed means, comprising a planetary gear mechanism having a rotatable annular gear housing with internal gear teeth for rotating said gear housing, a worm gearing for rotating said gear housing, and a variable speed mechanism to drive said worm gearing, together with a device actuated by said work carrying chains to throw said worm drive into rotation in either direction at selected times; whereby the normal speed of the work may be varied to cause staples to be set at non-uniform distances apart therein.

11. A machine for use in making boxes comprising in combination, a sprocket chain conveyor for feeding through the machine a plurality of box parts and a train of gearing for moving said chains at a constant, uniform speed, staple setting mechanism operable at regular intervals upon said moving box parts to place staples at certain normal distances apart therein, a planetary gear mechanism forming an element in said train of gearing, a second, normally inactive driving mechanism and a worm driven thereby, an external gear on the planetary gear housing in driving relation with said worm, said second mechanism comprising a direct and reverse bevel gear drive continuously actuated from the main drive shaft, clutch means adapted to join the worm drive shaft with either the direct or reverse bevel gear and so rotate said worm and intermeshing gear housing in a clockwise or counterclockwise direction, a clutch tripping means and cam lugs for actuating it secured to one of the said sprocket chains; whereby said worm drive is actuated in either direction at predetermined times to vary the speed of the chain drive and thereby cause staples to be driven in the box parts at distances apart greater or less than the normal spacing.

12. In an apparatus comprising endless carrying means for constantly moving a succession of articles through a stationary work zone, a prime mover for said means and a train of mechanism for transmitting motion from said prime mover to said carrying means, the combination, with said above described apparatus, of a variable speed element in said transmission chain, and a device, controlled by said carrying means for intermittently modifying the action of said element; whereby the speed of said carrying means may be automatically varied during predetermined periods of its operation.

13. The herein described method of setting staples at varying distances apart in a succession of panels or other work fed through a staple setting zone, which comprises performing successive staple setting operations in said zone on said work at regular time intervals, continuously feeding said work through said zone at one uniform speed during certain of said intervals and continuously at a lesser speed during other of said intervals.

14. The method of setting staples at predetermined points unequally spaced apart in a series of panels forming a box blank or the like structure, which method comprises the driving of staples at regular intervals while moving said series of panels continuously at a uniform speed during a certain period of operation for uniform spacing of said staples, accelerating said speed of movement to a uniform degree during another period of operation so as to increase the spacing distance between certain selected staples and retarding said speed of movement to a uniform degree during a third period of operation so as to reduce the spacing distance between other selected staples.

GUS L. COLBIE.